US012766411B2

(12) United States Patent
Comer et al.

(10) Patent No.: US 12,766,411 B2
(45) Date of Patent: Oct. 20, 2026

(54) IN-GAME USER INTERFACE (UI) MODIFICATION FOR DYNAMIC GAMING ENVIRONMENT

(71) Applicant: Dell Products L.P., Round Rock, TX (US)

(72) Inventors: Ryan Nicholas Comer, Round Rock, TX (US); Jyoti Jasmine Luu, Austin, TX (US); Jake Mitchell Leland, Round Rock, TX (US); Erik Summa, Austin, TX (US)

(73) Assignee: Dell Products L.P., Round Rock, TX (US)

(*) Notice: Subject to any disclaimer, the term of this patent is extended or adjusted under 35 U.S.C. 154(b) by 357 days.

(21) Appl. No.: 18/063,467

(22) Filed: Dec. 8, 2022

(65) Prior Publication Data

US 2024/0189714 A1 Jun. 13, 2024

(51) Int. Cl.
*A63F 13/537* (2014.01)

(52) U.S. Cl.
CPC .................................. *A63F 13/537* (2014.09)

(58) Field of Classification Search
CPC ............... A63F 13/5375; A63F 13/537; G06F 3/04845; G06F 3/1423; G06F 3/04812
See application file for complete search history.

(56) References Cited

U.S. PATENT DOCUMENTS

| | | | | |
|---|---|---|---|---|
| 5,949,408 A * | 9/1999 | Kang | G09G 3/3611 | 345/169 |
| 6,252,590 B1 * | 6/2001 | Sawai | H04N 21/4312 | 715/764 |
| 6,597,384 B1 * | 7/2003 | Harrison | G06F 3/03547 | 345/169 |
| 7,814,419 B2 * | 10/2010 | Fabritius | G06F 3/0488 | 715/764 |
| 8,310,408 B1 * | 11/2012 | Walker | G06F 3/1423 | 345/3.3 |
| 2003/0222889 A1 * | 12/2003 | Parulski | H04N 1/00188 | 345/619 |
| 2006/0197753 A1 * | 9/2006 | Hotelling | G06F 3/016 | 345/173 |

(Continued)

OTHER PUBLICATIONS

WinEight Forums, "How to Lock or Unlock Screen Auto Rotation in Windows 8 and Windows RT", Aug. 31, 2013, pp. 1-2, at (https://www.eightforums.com/threads/screen-autorotation-lock-or-unlock-in-windows-8.30587/) (last visited Aug. 20, 2025). (Year: 2013).*

(Continued)

*Primary Examiner* — Steve Rowland
(74) *Attorney, Agent, or Firm* — Norton Rose Fulbright US LLP

(57) ABSTRACT

Systems and methods described herein may detect user interface (UI) elements of a gaming application UI and rearrange and/or modify the UI elements in response to a change in aspect ratio of the gaming application. An anchor may be determined for each UI element as the aspect ratio of the gaming application changes such that the gaming application's aspect ratio may be changed without eliminating important UI elements. In cases where a UI element is modified, the UI element may be made collapsible, may be split into sub-elements, or may be separated from the rest of the UI elements and displayed on a separate device.

17 Claims, 9 Drawing Sheets

(56) References Cited

U.S. PATENT DOCUMENTS

| | | | | |
|---|---|---|---|---|
| 2006/0274087 | A1* | 12/2006 | Kim | G06F 1/1626 345/649 |
| 2009/0207184 | A1* | 8/2009 | Laine | H04N 21/41265 725/39 |
| 2010/0088532 | A1* | 4/2010 | Pollock | G06F 1/1694 345/650 |
| 2012/0249443 | A1* | 10/2012 | Anderson | A63F 13/213 345/173 |
| 2014/0089795 | A1* | 3/2014 | Vienneau | G06F 9/451 715/763 |
| 2014/0289362 | A1* | 9/2014 | Itoh | H04W 4/50 709/217 |
| 2016/0188171 | A1* | 6/2016 | Dye | G06F 3/04842 715/810 |

OTHER PUBLICATIONS

Bootstrap, Responsive UI frameworks: e.g. bootstrap—https://getbootstrap.com, retrieved on Dec. 8, 2022.

Kang et al., "Instance Segmentation Method of User Interface Component of Games", Appl. Sci., 2020, 10, 6502.

Unity, "Creating a custom render pipeline based on the Scriptable Render Pipeline—User Manual 2021.3 (LTS)", Unity Techonoglies, published Dec. 2, 2022.

Unity, "Unity UI 1.0.0—Basic Layout—The Rect Tool", Unity Technologies, 2020, https://docs.unity3d.com/Packages/com.unity.ugui@1.0/manual/UIBasicLayout.html#:~:text=the%20Scene%20View.-.

* cited by examiner

IN-GAME USER INTERFACE (UI) MODIFICATION FOR DYNAMIC GAMING ENVIRONMENT

FIELD OF THE DISCLOSURE

The instant disclosure relates to information handling systems. More specifically, portions of this disclosure relate to modifying presentation of one or more applications on a display.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications. Gaming applications presented on a device display (e.g., a computer monitor, TV, phone, tablet, etc.) are typically broken up into two parts for their rendered frames—the 2D or 3D world of the game and the user interface (UI). The UI may contain user input elements for user interaction (e.g., buttons) and textual/visual elements that contain information about the game (e.g., a mini map). The UI for different games can have a variety of complexities with different elements occupying different portions of a display. For example, the UI for different games may have UI elements of various sizes and positions on the display. Additionally, the various devices on which a gaming application could be displayed can have different capabilities as well as displays with different sizes and aspect ratios. Presenting the gaming application, including the UI, on a display in a practical, non-obtrusive way improves the user experience.

Aspects of embodiments of this disclosure involve resizing a displayed gaming application stream to a different aspect ratio including detecting UI elements in the gaming application stream and rearranging and/or modifying the UI elements. For instance, a user might stream multiple gaming application streams and/or other content (e.g., a TV streaming application) concurrently on the same screen of a device, thereby making it difficult to fit all of the content on the screen. Gaming applications may have preset resolutions for presentation and thus cannot adapt to any form factor. For instance, gaming applications are typically designed for a 16:9 aspect ratio and are difficult to fit them within a vertical layout, such as for a phone. Additionally, cropping the gaming application stream is not an option because doing so could hide UI elements from the user. Aspects of embodiments of this disclosure provide for detecting UI elements in a gaming application stream and determining a best anchor for each UI element as the aspect ratio of the gaming application stream changes such that the gaming application stream's aspect ratio may be changed without eliminating UI elements. In some aspects, a UI element may be made collapsible, may be split into sub-elements, or may be separated from the rest of the UI elements and displayed on a separate device.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. If the user changes environments mid-game, the system may need to change the aspect ratio(s) of the content that is displayed should the first environment's consumption device (e.g., TV) be sized differently than the second environment's consumption device (e.g., computer monitor). The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously. The system may adjust the aspect ratio of one or both of the games when hosted simultaneously on the same consumption device.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

According to one embodiment, a method for execution by an information handling system, such as a hub device, includes detecting a plurality of user interface (UI) elements included in a UI of a gaming application, wherein the gaming application is displayed with a first aspect ratio on a first device; receiving an indication of a change in an aspect ratio of the gaming application from the first aspect ratio to a second aspect ratio; generating a modified UI associated with the gaming application having the second aspect ratio, the modified UI including a modified arrangement of the UI elements; and displaying the gaming application with the second aspect ratio and having the modified UI.

In certain embodiments, detecting the plurality of UI elements includes determining an anchor point for each of the plurality of UI elements based on a first arrangement of the plurality of UI elements, the first arrangement associated with the gaming application being displayed with the first aspect ratio, and generating the modified UI includes generating the modified arrangement of the plurality of UI elements associated with the gaming application being displayed with the second aspect ratio based on the determined anchor points for each of the plurality of UI elements.

In certain embodiments, generating the second arrangement of the plurality of UI elements includes determining whether any of the UI elements overlap. Overlapping UI elements would hinder a user's ability to interact with the UI elements.

In certain embodiments, in response to determining that a first UI element and a second UI element overlap, the method includes modifying at least one of the first UI element and the second UI element. Modifying the first UI element and/or the second UI element enables the user to continue to interact with the first and second UI elements with the gaming application in the second aspect ratio and therefore enables the gaming application to be displayed in the second aspect ratio.

In certain embodiments, modifying the at least one of the first UI element and the second UI element includes one of: making the at least one of the first UI element and the second UI element collapsible, displaying the at least one of the first UI element and the second UI element on a second device, and separating the at least one of the first UI element and the second UI element into two or more UI sub-elements.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
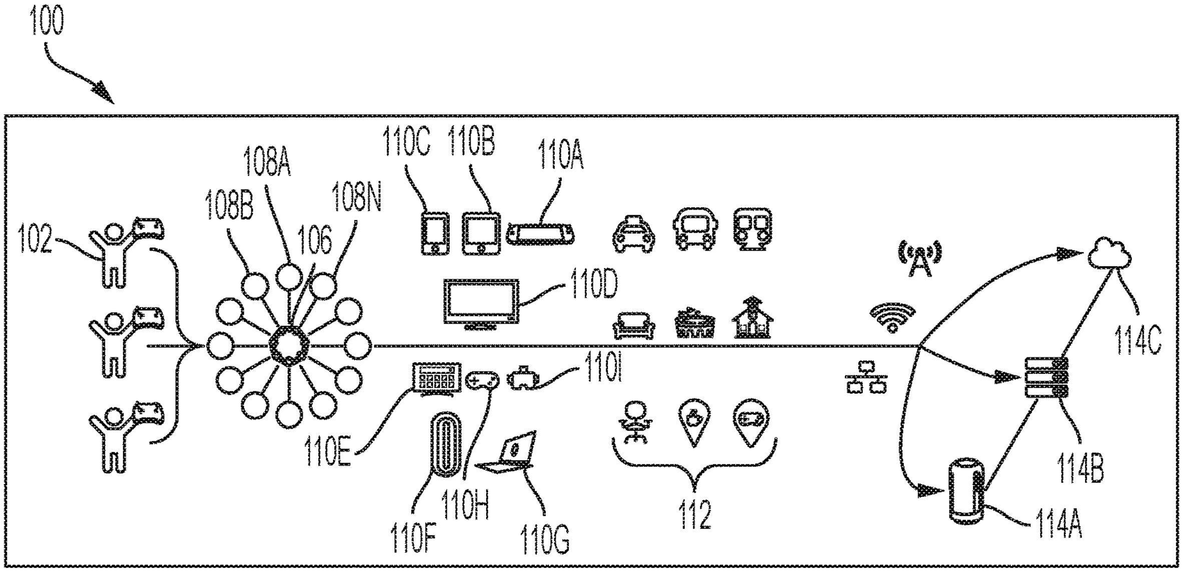
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. If the host device within the new environment has a display with a different aspect ratio, the hub device may modify the user interface of the application to accommodate the different aspect ratio. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
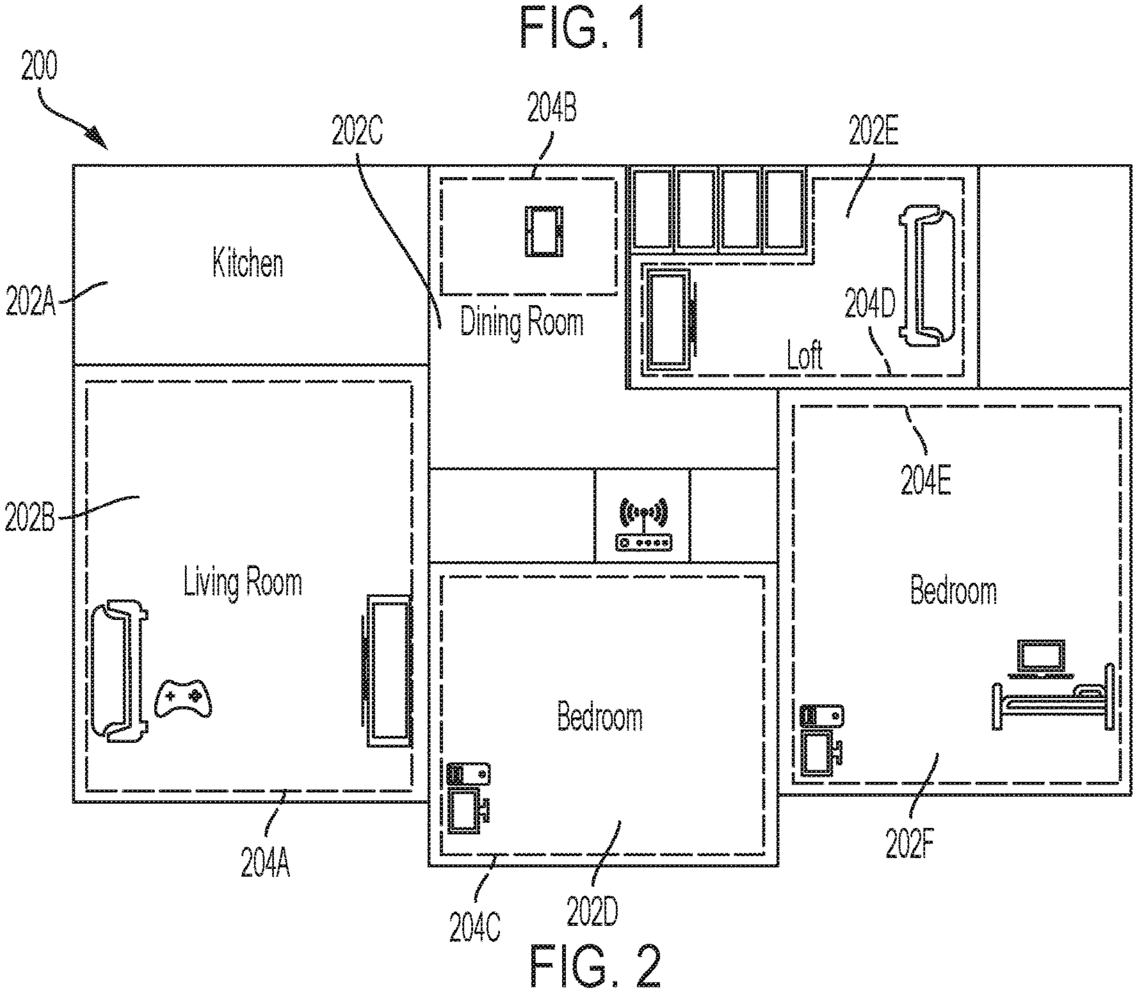
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
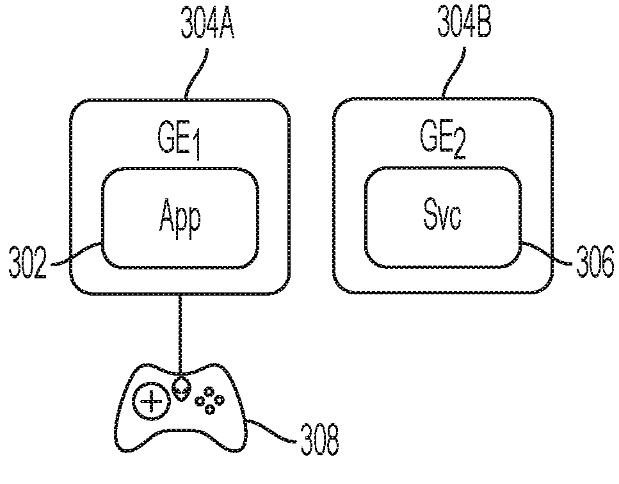
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
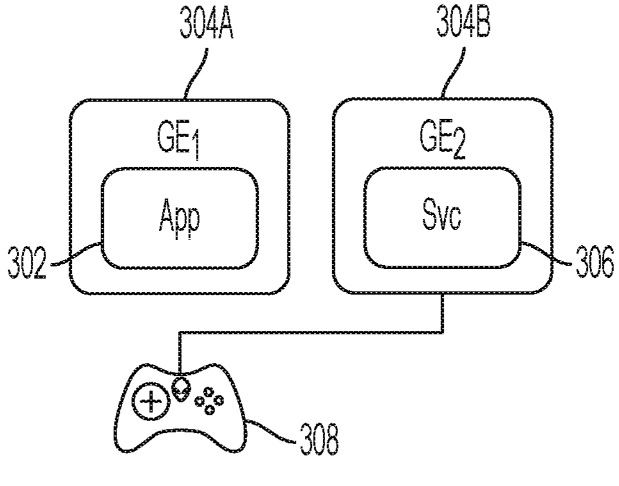
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
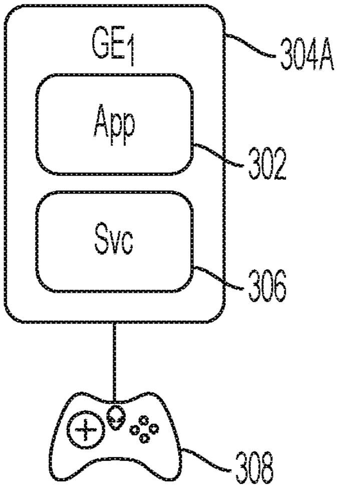
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
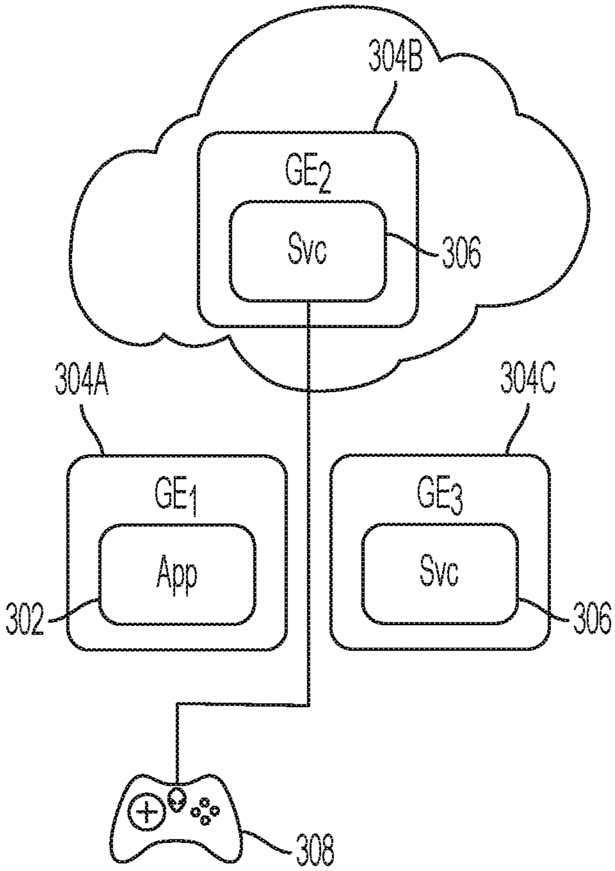
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4:
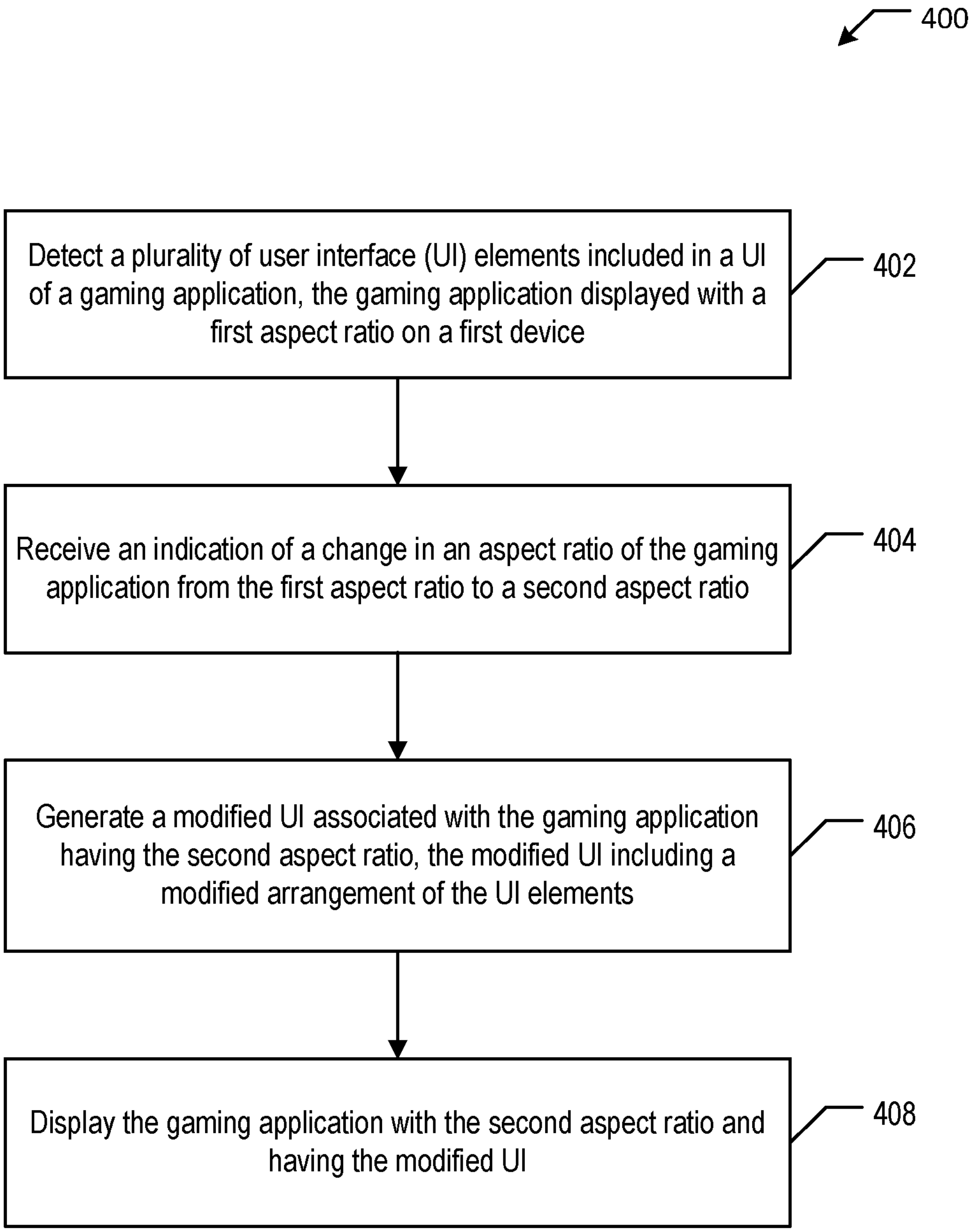
FIG. 4 is a method of generating a modified user interface to accommodate a change in aspect ratio of an application according to some embodiments of the disclosure.

FIG. 4 is a method 400 of generating a modified user interface (UI) to accommodate a gaming application including the UI being displayed with a different aspect ratio. For example, the hub device may migrate a gaming application from a television host device to a tablet computing host device having a display with an aspect ratio different than that of the television host device. In this example, the method 400 is described as being performed by the hub device, though the method 400 may be performed by one or more other suitable computing devices in other examples, such as a cloud hosting system. At block 402, the hub device may detect multiple UI elements included in a UI of a gaming application. Detecting the multiple UI elements may include determining an anchor point for each of the UI elements based on a first arrangement of the UI elements with the gaming application being displayed with the first aspect ratio. Example anchor points may be display coordinates, how far a UI element is from each corner of the display, how far a UI element is from each edge of the display, etc. The gaming application is initially displayed with a first aspect ratio (e.g., 16:9) on a first device (e.g., television 110D) at block 402.

At block 404, the hub device may receive an indication of a change in an aspect ratio of the gaming application from the first aspect ratio to a second aspect ratio (e.g., 9:19.5). For example, a user may open a web browser application that is displayed next to the gaming application on the television 110D, thereby reducing the size of the gaming application. In another example, the user may switch to streaming the gaming application on a different device (e.g., phone computing device 110C) having a differently sized display.

At block 406, the hub device may generate a modified UI associated with the gaming application having the second aspect ratio. The modified UI includes a modified arrangement of the UI elements. To generate the modified arrangement of UI elements, the hub device may position each of the UI elements based on the determined anchor points of the UI elements. For example, if an anchor point for a UI element is that the UI element is a certain distance from a corner of a display, then that UI element is positioned the same distance from the corner of the display in the modified arrangement. In some instances, the second aspect ratio is sized and shaped such that each UI element may be positioned at the anchor point determined for each UI element without any of the UI elements overlapping. In such instances, the modified arrangement may be checked against rules set by a user for the UI (e.g., restricted areas of display for UI elements, requirement to always move a mini map UI element to a separate display, etc.). If no user rules are violated, then the modified arrangement of UI elements is complete and the modified UI is ready to be displayed.

Figure 6:
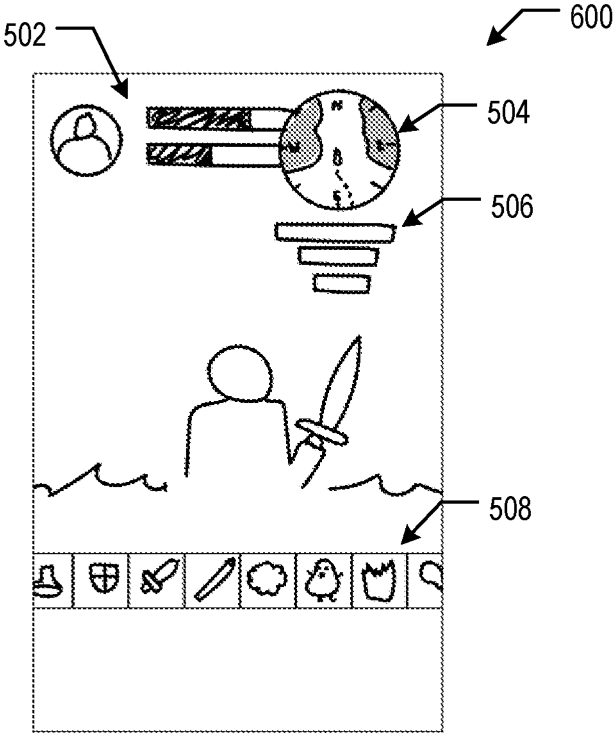
FIG. 6 is a display showing the gaming application of FIG. 5 with a different aspect ratio and overlapping user interface elements according to some embodiments of the disclosure.

In other instances, two or more UI elements may overlap when positioned at their respective anchor points in the second aspect ratio (e.g., see FIG. 6 discussed below). In such other instances in which UI elements overlap, the hub device may classify each UI element as a type of UI element (e.g., mini map, health bar, etc.). The types of UI elements, along with a variety of other input parameters described below, may be input to a machine learning model that outputs a modification for at least one of the UI elements. Example modifications may include breaking a UI element apart into two or more sub-elements (e.g., see FIGS. 7 and 8), making a UI element collapsible with a toggle button (e.g., see FIGS. 7 and 8), and migrating a UI element to a separate display in communication with the hub device (e.g., see FIG. 9). Example input parameters to the machine learning model may include some or all of: the user rules described above, the device that will display the gaming application in the second aspect ratio, a target position of each of the UI elements on the display, a target width and height of each UI element, a location (e.g., anchor point) of each UI element in the first arrangement of the UI elements with the gaming application being displayed with the first aspect ratio, a width of the gaming application in the second aspect ratio, a height of the gaming application in the second aspect ratio, and an importance value of each UI element to a user.

In accordance with the output of the machine learning model, the hub device may modify one or more UI elements. With the UI element(s) modified, there are no longer any overlapping UI elements and the modified arrangement of UI elements is complete.

At block 408, the hub device may display the gaming application with the second aspect ratio and having the modified UI. In aspects in which one or more displayed UI elements are modified, any interactions by the user with a modified UI element will be captured and re-mapped back to the original location of the UI element to drive game logic. In some aspects, the hub device may display the gaming application and modified UI in the second aspect ratio on the same first device (e.g., television 110D) as block 402. For instance, one or more other applications (e.g., web browser application, chat application, etc.) may be initiated on the first device in a split screen arrangement such that a size of the gaming application is reduced. In other aspects, the hub device may display the gaming application and modified UI in the second aspect ratio on a second device (e.g., phone computing device 110C). For instance, the gaming application may be migrated from the television 110D to the phone computing device 110C.

Figure 5:
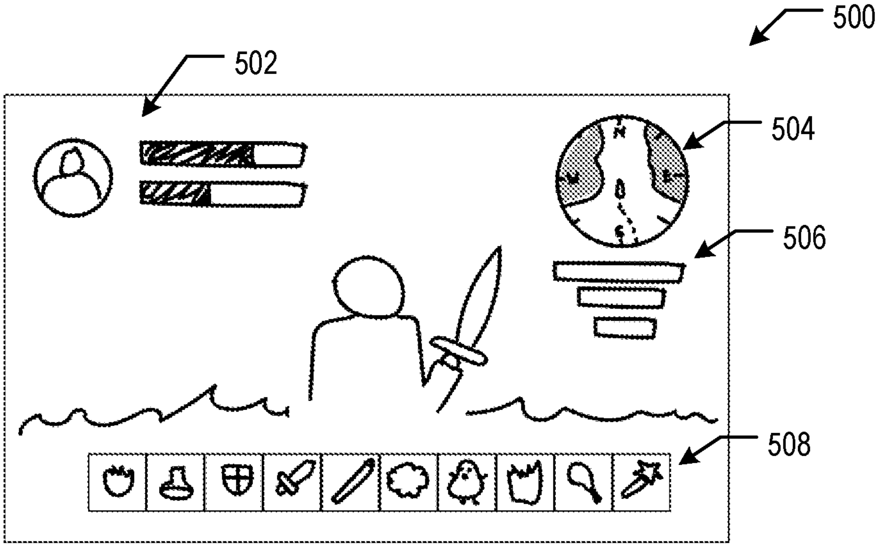
FIG. 5 is a display showing a gaming application with a user interface having multiple user interface elements according to some embodiments of the disclosure.

FIG. 5 illustrates a display 500 showing a gaming application and a UI. The display 500 has a first aspect ratio (e.g., 16:9). The UI includes multiple UI elements 502-508. For example, the UI element 502 is a user ID, health bar, and shield bar. The UI element 504 is a mini map. The UI element 506 is text instructions. The UI element 508 is a weapons arsenal. FIG. 6 illustrates a display 600 showing the same gaming application and UI adjusted to the aspect ratio (e.g., 9:19.5) of the display 600. For instance, each of the UI elements 502-508 are positioned at their respective anchor points. As shown, however, the UI element 504 overlaps the UI element 502, and the UI element 508 does not fit on the display 600. Additionally, the UI element 506 is near the center of the display 600 which a user rule may prohibit.

Figure 7:
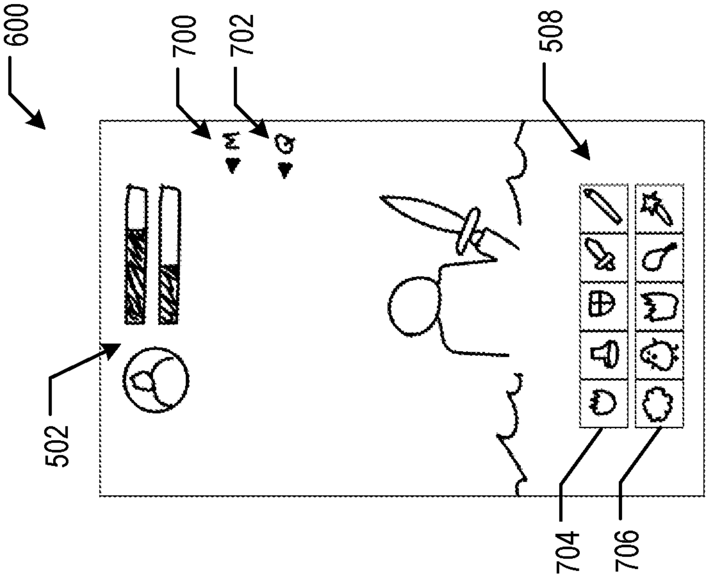
FIG. 7 is a display showing the gaming application of FIG. 5 with the aspect ratio of FIG. 6 and having a modified user interface according to some embodiments of the disclosure.
Figure 8:
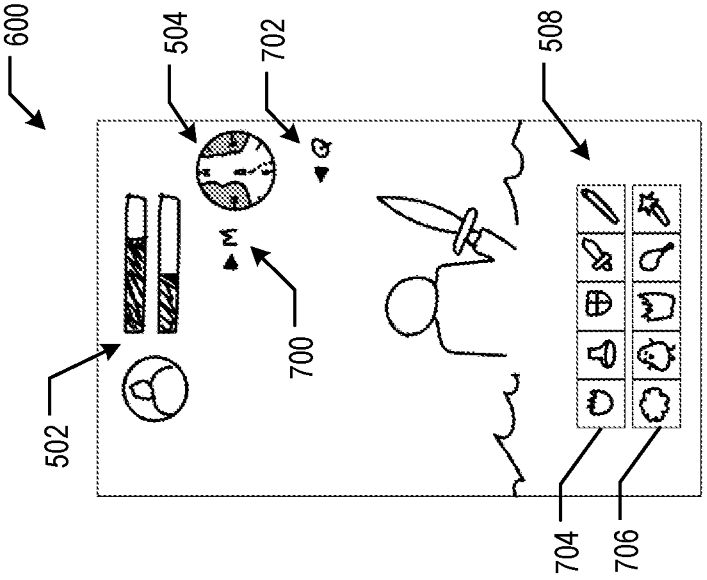
FIG. 8 is a display showing the gaming application of FIG. 7 with a collapsible user interface element visible according to some embodiments of the disclosure.

FIGS. 7 and 8 illustrate the display 600 showing the gaming application and a modified UI. In the modified UI, the UI elements 504 and 506 are converted into collapsible toggle buttons 700 and 702, respectively. FIG. 7 shows each of the toggle buttons 700 and 702 in a collapsed state, whereas FIG. 8 shows the toggle button 700 in an open state such that the UI element 504 is visible. A user may toggle between the collapsed and open states of the toggle buttons 700 and 702 by interacting with (e.g., clicking with a cursor) the toggle buttons 700 and 702. Converting the UI elements 504 and 506 into the toggle buttons 700 and 702 creates space to center the UI element 502 at the top of the display 600 as compared to the original anchor point of the UI element 502 on the display 500. Additionally, the UI element 508 is broken into a sub-element 704 and a sub-element 706 so that the entirety of the UI element 508 fits on the display 600.

Figure 9:
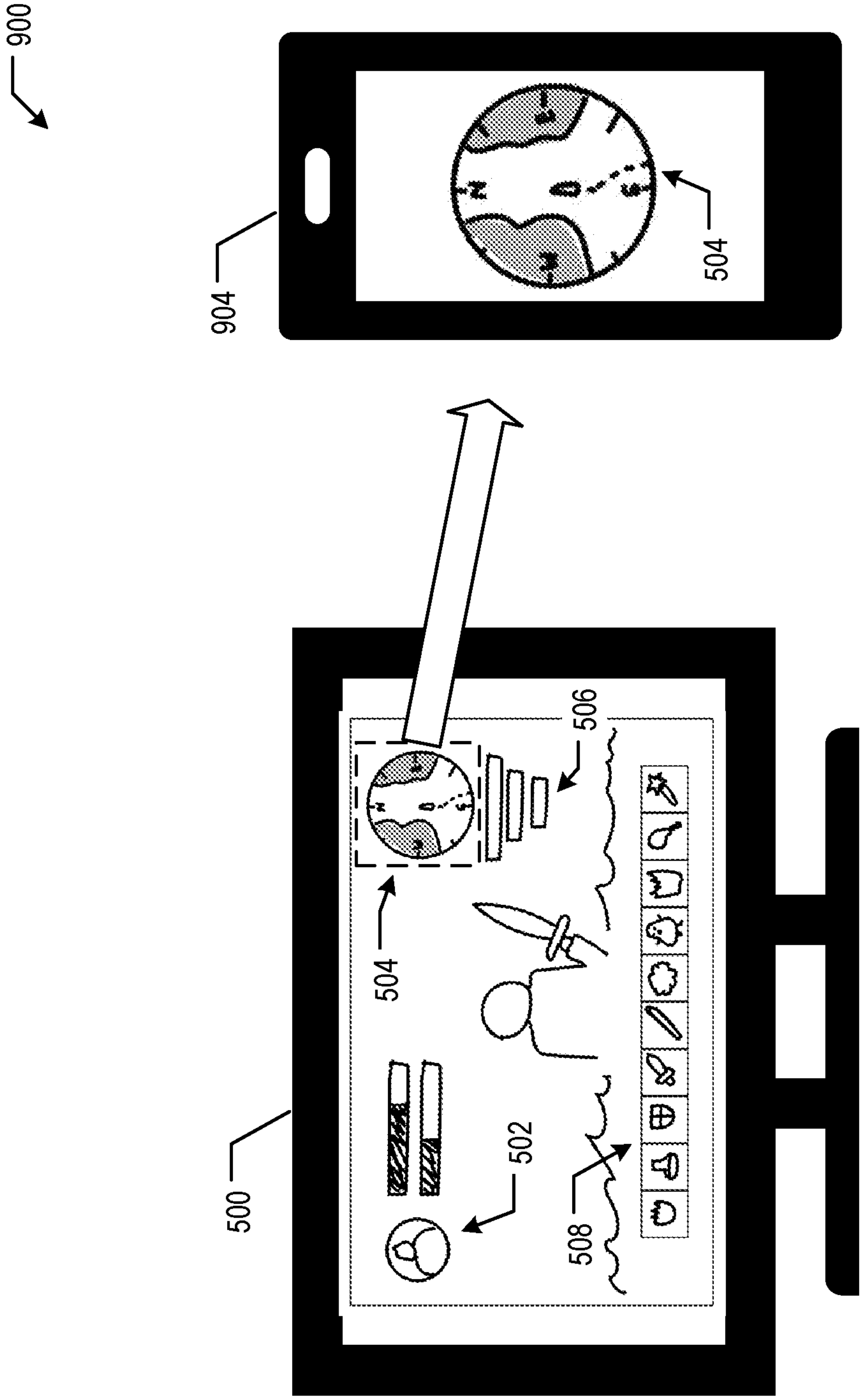
FIG. 9 shows user interface elements of a user interface being split among multiple devices according to some embodiments of the disclosure.

As described above, in some embodiments, a modified UI may include migrating a UI element to a separate display. FIG. 9 illustrates an example modified UI 900 in which the UI element 504 is migrated from the display 500 to the display 904. The UI element 504 may be migrated to the display 904 for a number of reasons. For example, the display 500 may be too crowded such that the UI elements obstruct gameplay, and therefore the UI element 504 is migrated to the display 904 to free up space. In another example, a user rule may require that UI element 504 be migrated to the display 904 due to the user's preference.

Figure 10:
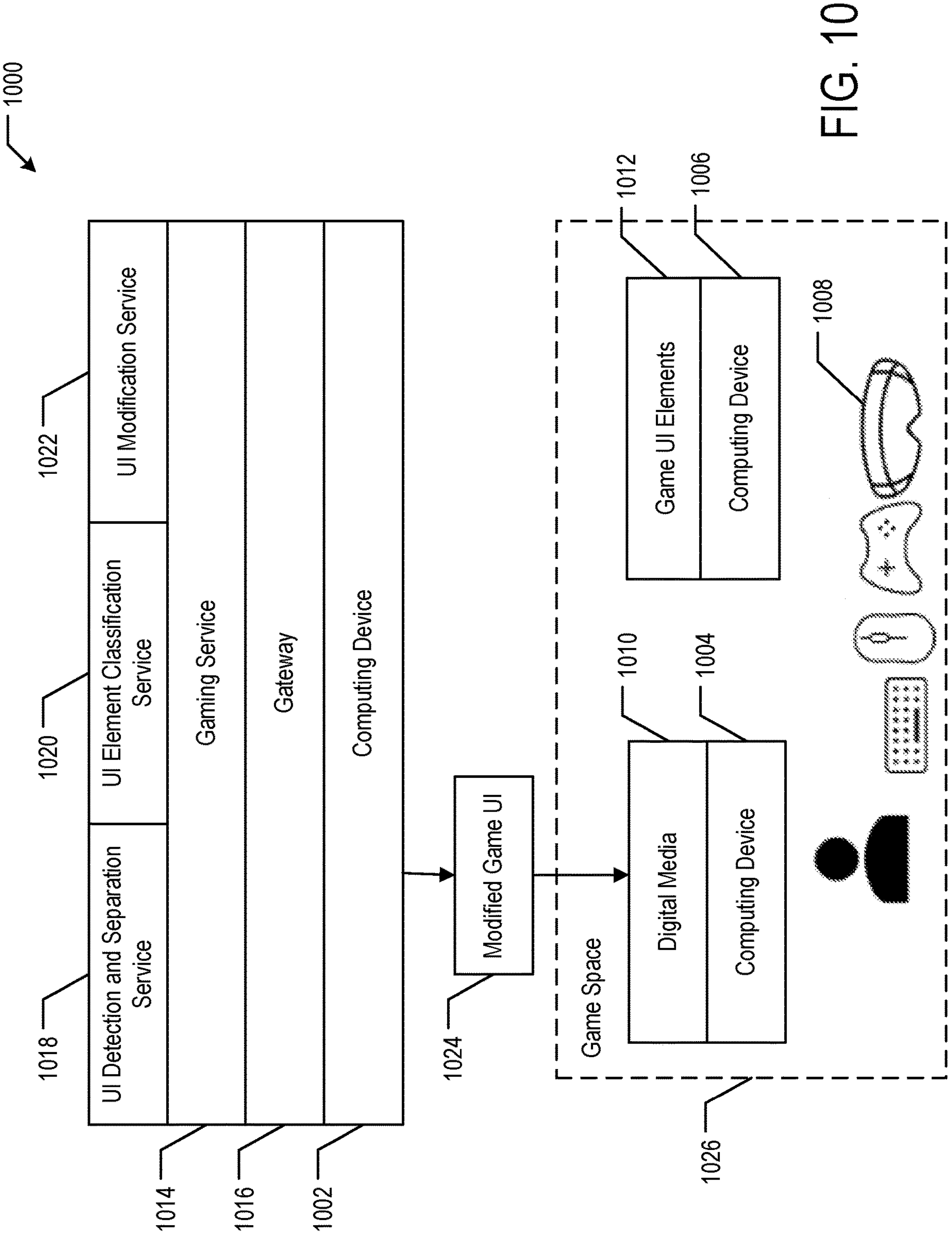
FIG. 10 shows a system for modifying a UI of a gaming application according to some embodiments of the disclosure.

FIG. 10 depicts a system 1000 according to an exemplary embodiment of the present disclosure. The system 1000 may be configured to modify a UI of a gaming application, such as a game application being played by a user in a game space 1026. The system 1000 includes a computing device 1002 (e.g., a server), which may be configured to generate a modified UI in response to a change in aspect ratio of a gaming application. In particular, the game space 1026 includes the computing devices 1004 and 1006. The game space 1026 may be an exemplary implementation of the environments 204A-C and/or the rooms 202A-E. The computing devices 1004 and 1006 may include one or more gaming consoles, laptop computers, smartphones, smart home speakers, smart home devices, gaming devices such as controllers, and/or any other type of computing device (e.g., personal computing device, professional computing device).

The computing devices 1004 and 1006 may display digital media 1010 in the game space 1026. The digital media 1010 may include a gaming application, and in some aspects, other suitable applications (e.g., web browsing application, chat application, social media application, etc.). The gaming application includes game UI elements 1012. In an example, the computing device 1004 may display a gaming application and a chat application, and the computing device 1006 may display one of the UI elements 1012 of the gaming application. The game space 1026 may also include periphery devices 1008 (e.g., keyboard, mouse, game controller, virtual reality headset) that users in the game space 1026 may use to control the presentation of digital media 1010 by computing device 1004 or another computing device 1002. In certain instances, users in the game space 1026 may initiate or terminate applications at the same time as playing a gaming application. In other instances, users in the game space 1026 may request to migrate digital media 1010 from the computing device 1004 to the computing device 1006.

The computing device 1002 may be configured to receive indications that the aspect ratio of a gaming application has changed and modify a UI of the gaming application appropriately to generate a modified game UI 1024. In particular, the computing device 1002 may be configured to receive indications that the aspect ratio of a gaming application has changed from the computing device 1004 and/or 1006 and generate a modified game UI 1024 in response for the new aspect ratio. The computing device 1002 may include a gateway 1016 and the gaming service 1014. The gateway 1016 may be responsible for network communication and other services. For example, the computing device 1002 may be an orchestrator or other computing device for a distributed computing environment, and the gateway 1016 may coordinate communication with the computing devices in the distributed computing environment. The gateway 1016 may further implement a gaming service 1014 which may provide one or more gaming services to requesting computing devices 1004 and 1006. In certain implementations, the gaming service 1014 may be configured to receive indications that the aspect ratio of a gaming application has changed and modify a UI of the gaming application appropriately to generate a modified game UI 1024. Accordingly, the gaming service 1014 may include a UI detection and separation service 1018, a UI element classification service 1020, and a UI modification service 1022.

The operations of the computing device 1002 and in particular of the UI detection and separation service 1018, UI element classification service 1020, and UI modification service 1022 are described in greater detail above in connection with FIG. 4. For example, the UI detection and separation service 1018 may be configured to detect UI elements in a UI of a gaming application (e.g., block 402). The UI element classification service 1020 may be configured to classify UI elements as a type of UI element (e.g., block 406). The UI modification service 1022 may be configured to generate a modified UI (e.g., block 406).

Figure 11:
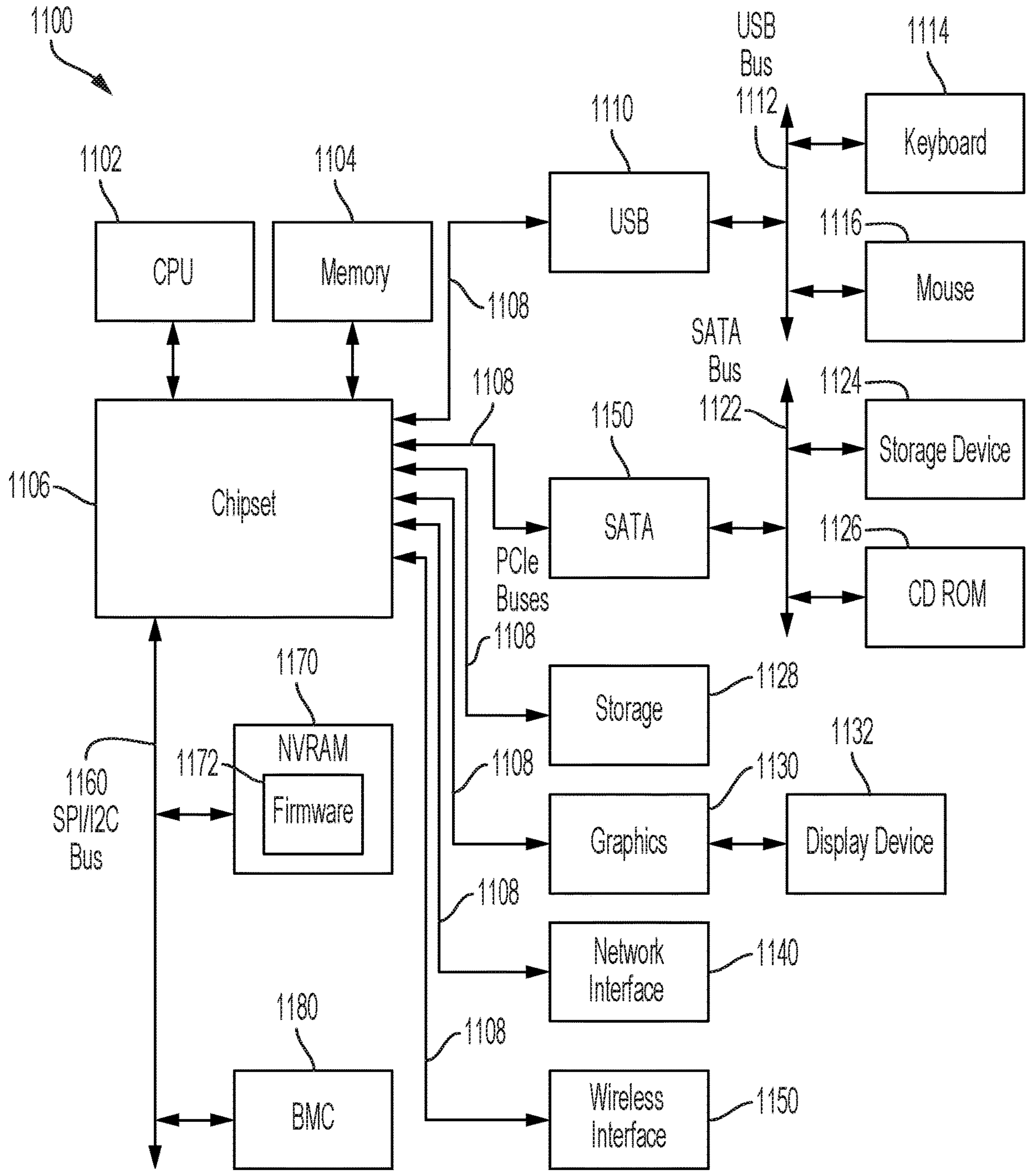
FIG. 11 is a schematic block diagram of an example information handling system according to some embodiments of the disclosure.

FIG. 11 illustrates an example information handling system 1100. Information handling system 1100 may include a processor 1102 (e.g., a central processing unit (CPU)), a memory (e.g., a dynamic random-access memory (DRAM)) 1104, and a chipset 1106. In some embodiments, one or more of the processor 1102, the memory 1104, and the chipset 1106 may be included on a motherboard (also referred to as a mainboard), which is a printed circuit board (PCB) with embedded conductors organized as transmission lines between the processor 1102, the memory 1104, the chipset 1106, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1102, the memory 1104, the chipset 1106, and/or other components may be organized as a System on Chip (SoC).

The processor 1102 may execute program code by accessing instructions loaded into memory 1104 from a storage device, executing the instructions to operate on data also loaded into memory 1104 from a storage device, and generate output data that is stored back into memory 1104 or sent to another component. The processor 1102 may include processing cores capable of implementing any of a variety of instruction set architectures (ISAs), such as the ×86, POWERPC®, ARM®, SPARC®, or MIPS® ISAs, or any other suitable ISA. In multi-processor systems, each of the processors 1102 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1106 may facilitate the transfer of data between the processor 1102, the memory 1104, and other components. In some embodiments, chipset 1106 may include two or more integrated circuits (ICs), such as a northbridge controller coupled to the processor 1102, the memory 1104, and a southbridge controller, with the southbridge controller coupled to the other components such as USB 1110, SATA 1120, and PCIe buses 1108. The chipset 1106 may couple to other components through one or more PCIe buses 1108.

Some components may be coupled to one bus line of the PCIe buses 1108, whereas some components may be coupled to more than one bus line of the PCIe buses 1108. One example component is a universal serial bus (USB) controller 1110, which interfaces the chipset 1106 to a USB bus 1112. A USB bus 1112 may couple input/output components such as a keyboard 1114 and a mouse 1116, but also other components such as USB flash drives, or another information handling system. Another example component is a SATA bus controller 1120, which couples the chipset 1106 to a SATA bus 1122. The SATA bus 1122 may facilitate efficient transfer of data between the chipset 1106 and components coupled to the chipset 1106 and a storage device 1124 (e.g., a hard disk drive (HDD) or solid-state disk drive (SDD)) and/or a compact disc read-only memory (CD-ROM) 1126. The PCIe bus 1108 may also couple the chipset 1106 directly to a storage device 1128 (e.g., a solid-state disk drive (SDD)). A further example of an example component is a graphics device 1130 (e.g., a graphics processing unit (GPU)) for generating output to a display device 1132, a network interface controller (NIC) 1140, and/or a wireless interface 1150 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1106 may also be coupled to a serial peripheral interface (SPI) and/or Inter-Integrated Circuit (I2C) bus 1160, which couples the chipset 1106 to system management components. For example, a non-volatile random-access memory (NVRAM) 1170 for storing firmware 1172 may be coupled to the bus 1160. As another example, a controller, such as a baseboard management controller (BMC) 1180, may be coupled to the chipset 1106 through the bus 1160. BMC 1180 may be referred to as a service processor or embedded controller (EC). Capabilities and functions provided by BMC 1180 may vary considerably based on the type of information handling system. For example, the term baseboard management system may be used to describe an embedded processor included at a server, while an embedded controller may be found in a consumer-level device. As disclosed herein, BMC 1180 represents a processing device different from processor 1102, which provides various management functions for information handling system 1100. For example, an embedded controller may be responsible for power management, cooling management, and the like. An embedded controller included at a data storage system may be referred to as a storage enclosure processor or a chassis processor.

System 1100 may include additional processors that are configured to provide localized or specific control functions, such as a battery management controller. Bus 1160 can include one or more busses, including a Serial Peripheral Interface (SPI) bus, an Inter-Integrated Circuit (I2C) bus, a system management bus (SMBUS), a power management bus (PMBUS), or the like. BMC 1180 may be configured to provide out-of-band access to devices at information handling system 1100. Out-of-band access in the context of the bus 1160 may refer to operations performed prior to execution of firmware 1172 by processor 1102 to initialize operation of system 1100.

Firmware 1172 may include instructions executable by processor 102 to initialize and test the hardware components of system 1100. For example, the instructions may cause the processor 1102 to execute a power-on self-test (POST). The instructions may further cause the processor 1102 to load a boot loader or an operating system (OS) from a mass storage device. Firmware 1172 additionally may provide an abstraction layer for the hardware, such as a consistent way for application programs and operating systems to interact with the keyboard, display, and other input/output devices. When power is first applied to information handling system 1100, the system may begin a sequence of initialization procedures, such as a boot procedure or a secure boot procedure. During the initialization sequence, also referred to as a boot sequence, components of system 1100 may be configured and enabled for operation and device drivers may be installed. Device drivers may provide an interface through which other components of the system 1100 can communicate with a corresponding device. The firmware 1172 may include a basic input-output system (BIOS) and/or include a unified extensible firmware interface (UEFI). Firmware 1172 may also include one or more firmware modules of the information handling system. Additionally, configuration settings for the firmware 1172 and firmware of the information handling system 1100 may be stored in the NVRAM 1170. NVRAM 1170 may, for example, be a non-volatile firmware memory of the information handling system 1100 and may store a firmware memory map namespace 1100 of the information handling system. NVRAM 1170 may further store one or more container-specific firmware memory map namespaces for one or more containers concurrently executed by the information handling system.

Information handling system 1100 may include additional components and additional busses, not shown for clarity. For example, system 1100 may include multiple processor cores (either within processor 1102 or separately coupled to the chipset 1106 or through the PCIe buses 1108), audio devices (such as may be coupled to the chipset 1106 through one of the PCIe busses 1108), or the like. While a particular arrangement of bus technologies and interconnections is illustrated for the purpose of example, one of skill will appreciate that the techniques disclosed herein are applicable to other system architectures. System 1100 may include multiple processors and/or redundant bus controllers. In some embodiments, one or more components may be integrated together in an integrated circuit (IC), which is circuitry built on a common substrate. For example, portions of chipset 1106 can be integrated within processor 1102. Additional components of information handling system 1100 may include one or more storage devices that may store machine-executable code, one or more communications ports for communicating with external devices, and various input and output (I/O) devices, such as a keyboard, a mouse, and a video display.

In some embodiments, processor 1102 may include multiple processors, such as multiple processing cores for parallel processing by the information handling system 1100. For example, the information handling system 1100 may include a server comprising multiple processors for parallel processing. In some embodiments, the information handling system 1100 may support virtual machine (VM) operation, with multiple virtualized instances of one or more operating systems executed in parallel by the information handling system 1100. For example, resources, such as processors or processing cores of the information handling system may be assigned to multiple containerized instances of one or more operating systems of the information handling system 1100 executed in parallel. A container may, for example, be a virtual machine executed by the information handling system 1100 for execution of an instance of an operating system by the information handling system 1100. Thus, for example, multiple users may remotely connect to the information handling system 1100, such as in a cloud computing configuration, to utilize resources of the information handling system 1100, such as memory, processors, and other hardware, firmware, and software capabilities of the information handling system 1100. Parallel execution of multiple containers by the information handling system 1100 may allow the information handling system 1100 to execute tasks for multiple users in parallel secure virtual environments.

The schematic or flow chart diagrams of FIG. 4 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:

detecting a plurality of user interface (UI) elements included in a first arrangement in a UI of an application, wherein the application is displayed with a first aspect ratio of a first width of the application to a first height of the application on a first device, wherein detecting the plurality of UI elements includes determining an anchor point for each of the plurality of UI elements based on a first arrangement of the plurality of UI elements, the first arrangement associated with the application being displayed with the first aspect ratio, wherein the determining an anchor point for each of the plurality of UI elements includes generating a plurality of anchor points associated with the plurality of UI elements, and wherein a first anchor point of the plurality of anchor points is determined according to how far a first UI element associated with the first anchor point is from each corner of a display of the first device;

receiving an indication of a change in an aspect ratio of the application from the first aspect ratio to a second aspect ratio of a second width of the application to a second height of the application;

generating a modified UI associated with the application having the second aspect ratio, the modified UI including a different, second arrangement of the plurality of the UI elements, wherein generating the modified UI includes generating the second arrangement of the plurality of UI elements associated with the application being displayed with the second aspect ratio based on the determined anchor points for each of the plurality of UI elements; and displaying the application with the second aspect ratio having the modified UI.

2. The method of claim 1, wherein generating the second arrangement of the plurality of UI elements includes determining whether any of the UI elements overlap.

3. The method of claim 2, wherein in response to determining that a first UI element and a second UI element overlap, modifying at least one of the first UI element and the second UI element.

4. The method of claim 3, wherein modifying the at least one of the first UI element and the second UI element includes making the at least one of the first UI element and the second UI element collapsible.

5. The method of claim 3, wherein modifying the at least one of the first UI element and the second UI element includes displaying the at least one of the first UI element and the second UI element on a second device.

6. The method of claim 3, wherein modifying the at least one of the first UI element and the second UI element includes separating the at least one of the first UI element and the second UI element into two or more UI sub-elements.

7. The method of claim 1, wherein the application is displayed with the second aspect ratio on the first device.

8. The method of claim 1, wherein the application is displayed with the second aspect ratio on a second device.

9. The method of claim 1, further comprising:

receiving an indication of a user interaction with a UI element arranged in the second arrangement; and mapping the user interaction to a location of the UI element associated with the application having the first aspect ratio.

10. An information handling system, comprising:

a memory;

a processor coupled to the memory, wherein the processor is configured to perform steps comprising:

detecting a plurality of user interface (UI) elements included in a UI of an application, wherein the application is displayed with a first aspect ratio of a first width of the application to a first height of the application on a first device, wherein detecting the plurality of UI elements includes determining an anchor point for each of the plurality of UI elements based on a first arrangement of the plurality of UI elements, the first arrangement associated with the application being displayed with the first aspect ratio, wherein the determining an anchor point for each of the plurality of UI elements includes generating a plurality of anchor points associated with the plurality of UI elements, and wherein a first anchor point of the plurality of anchor points is determined according to how far a first UI element associated with the first anchor point is from each corner of a display of the first device;

receiving an indication of a change in an aspect ratio of the application from the first aspect ratio to a second aspect ratio of a second width of the application to a second height of the application;

generating a modified UI associated with the application having the second aspect ratio, the modified UI including a different, second arrangement of the UI elements, wherein generating the modified UI includes generating the second arrangement of the plurality of UI elements associated with the application being displayed with the second aspect ratio based on the determined anchor points for each of the plurality of UI elements; and displaying the application with the second aspect ratio and having the modified UI.

11. The information handling system of claim 10, wherein generating the second arrangement of the plurality of UI elements includes determining whether any of the UI elements overlap.

12. The information handling system of claim 11, wherein in response to determining that a first UI element and a second UI element overlap, modifying at least one of the first UI element and the second UI element.

13. The information handling system of claim 12, wherein modifying the at least one of the first UI element and the second UI element includes making the at least one of the first UI element and the second UI element collapsible.

14. The information handling system of claim 12, wherein modifying the at least one of the first UI element and the second UI element includes displaying the at least one of the first UI element and the second UI element on a second device.

15. The information handling system of claim 12, wherein modifying the at least one of the first UI element and the second UI element includes separating the at least one of the first UI element and the second UI element into two or more UI sub-elements.

16. A computer program product, comprising:

a non-transitory computer readable medium comprising code for performing steps comprising:

detecting a plurality of user interface (UI) elements included in a UI of an application, wherein the application is displayed with a first aspect ratio of a first width of the application to a first height of the application on a first device, wherein detecting the plurality of UI elements includes determining an anchor point for each of the plurality of UI elements based on a first arrangement of the plurality of UI elements, the first arrangement associated with the application being displayed with the first aspect ratio, wherein the determining an anchor point for each of the plurality of UI elements includes generating a plurality of anchor points associated with the plurality of UI elements, and wherein a first anchor point of the plurality of anchor points is determined according to how far a first UI element associated with the first anchor point is from each corner of a display of the first device;

receiving an indication of a change in an aspect ratio of the application from the first aspect ratio to a second aspect ratio of a second width of the application to a second height of the application;

generating a modified UI associated with the application having the second aspect ratio, the modified UI including a different, second arrangement of the UI elements, wherein generating the modified UI includes generating the second arrangement of the plurality of UI elements associated with the application being displayed with the second aspect ratio based on the determined anchor points for each of the plurality of UI elements; and displaying the application with the second aspect ratio and having the modified UI.

17. The computer program product of claim 16, wherein generating the second arrangement of the plurality of UI elements includes determining whether any of the UI elements overlap, wherein in response to determining that a first UI element and a second UI element overlap, modifying at least one of the first UI element and the second UI element.

* * * * *